United States Patent
Snavely et al.

[11] Patent Number: 6,015,074
[45] Date of Patent: Jan. 18, 2000

[54] ROOF RACK FOR A VEHICLE

[76] Inventors: Travis J. Snavely; John F. Braun; Gerald L. Braun, all of Rte. 2, Box 36, Miltonvale, Kans. 67466

[21] Appl. No.: 09/108,261

[22] Filed: Jul. 1, 1998

[51] Int. Cl.[7] ................................................. B60R 9/042
[52] U.S. Cl. ....................... 224/310; 224/319; 224/324; 414/462
[58] Field of Search ..................................... 224/309, 310, 224/319, 545, 548, 553, 554, 42.12, 42.26, 324; 414/462

[56] References Cited

U.S. PATENT DOCUMENTS

| | | |
|---|---|---|
| 4,291,823 | 9/1981 | Freeman et al. . |
| 4,350,471 | 9/1982 | Lehmann . |
| 4,826,387 | 5/1989 | Audet . |
| 5,535,929 | 7/1996 | Neill . |
| 5,544,796 | 8/1996 | Dubach . |

FOREIGN PATENT DOCUMENTS

| | | |
|---|---|---|
| 0014185 | 1/1980 | European Pat. Off. . |
| 0027531 | 9/1980 | European Pat. Off. . |
| 0511179 | 4/1992 | European Pat. Off. . |
| 2673404 | 2/1991 | France . |
| 3025746 | 1/1982 | Germany . |

*Primary Examiner*—Gregory M. Vidovich
*Attorney, Agent, or Firm*—Chase & Yakimo, L.C.

[57] ABSTRACT

A roof rack for a vehicle including a support member which is removably secured to the roof thereof and a telescoping member slidably attached within the support member for movement between a transport position and a loading position. The telescoping member includes a first segment hinged to a second segment which rotates about its axis when in the loading position. A brace, which is fixed to the support member, braces the second segment when in the loading position and limits the extent of its rotation, ultimately preventing the telescoping member from contacting the vehicle's side panels. Articles are loaded onto an L-shaped bracket which extends upwardly from the outer ends of the telescoping member and parallel thereto to space the load above the vehicle's roof when in the transport position.

18 Claims, 4 Drawing Sheets

6,015,074

ROOF RACK FOR A VEHICLE

FIELD OF THE INVENTION

This invention relates to an improved vehicle roof rack for carrying various articles. More specifically, the roof rack is easy to load without damaging the vehicle.

BACKGROUND OF THE INVENTION

Vehicle roof racks are useful for additional storage space for a variety of articles, such as skis, bicycles, spare tires and luggage. Roof racks are typically immobile and rigidly secured to the roof of the vehicle. Placing articles on top of a vehicle can be difficult due to the roof's height or the article's weight.

Previously disclosed roof racks have attempted to solve these problems by mobilizing portions of the roof rack to a position that facilitates easy loading thereof. Unfortunately, many of these designs rely on the vehicle's side as a brace for the roof rack during loading which may cause damage thereto.

Furthermore, previously disclosed roof racks limit the amount and variety of articles which can be placed on the roof rack due to the limited surface area provided by the load-bearing portions of the roof rack.

SUMMARY OF THE INVENTION

Accordingly, a primary object of the subject invention is to provide a roof rack having a hinged, telescoping member which lowers the loading surface to a reasonable height and facilitates loading the rack.

Another object of the subject invention is to provide a roof rack having support braces which limit the rotation of the loading surface to protect the vehicle's side panels.

Still another object of the subject invention is to provide a roof rack having an L-shaped loading platform which provides a large surface area spaced above the vehicle's roof.

Yet another object of the subject invention is to provide a roof rack for a vehicle that is easy to load and can carry a wide variety of articles.

Yet another object of the subject invention is to provide a roof rack that is easy and inexpensive to manufacture.

Still another object of the subject invention is to provide a roof rack having only a few moving parts making it easy to use and maintain.

These objects are attained by providing a roof rack for a vehicle comprising a support member which is removably secured to the roof of a vehicle. A telescoping member is slidably attached within said support member for movement between a transport position and a loading position. The telescoping member consists of a first segment hinged to a second segment. The second segment rotates when in the loading position. A brace, which is fixed to the support member, braces the second segment when in the loading position and limits the extent of its rotation, ultimately preventing the telescoping member from contacting the vehicle's side panels. Articles are loaded onto an L-shaped bracket which extends upwardly from the outer ends of the telescoping member and parallel thereto to space the load above the vehicle's roof when in the transport position.

Other objects and advantages of this invention will become apparent from the following description taken in connection with the accompanying drawings, wherein is set forth by way of illustration and example, an embodiment of this invention.

DESCRIPTION OF THE PREFERRED EMBODIMENT

Figure 1:
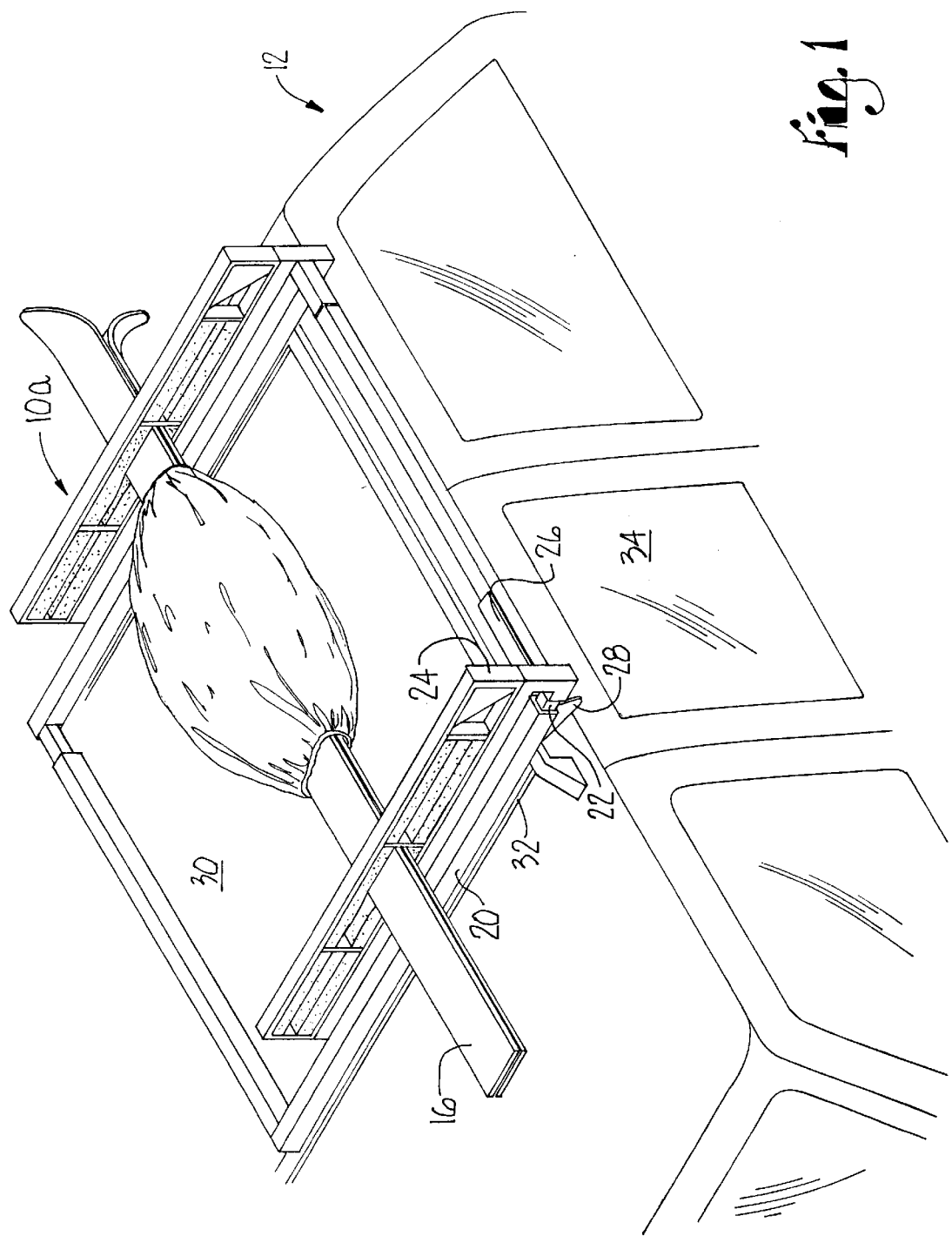
FIG. 1 is a perspective view of one half of the roof rack mounted to a vehicle roof in the transport position in accordance with the present invention and showing skis loaded therein.
Figure 2:
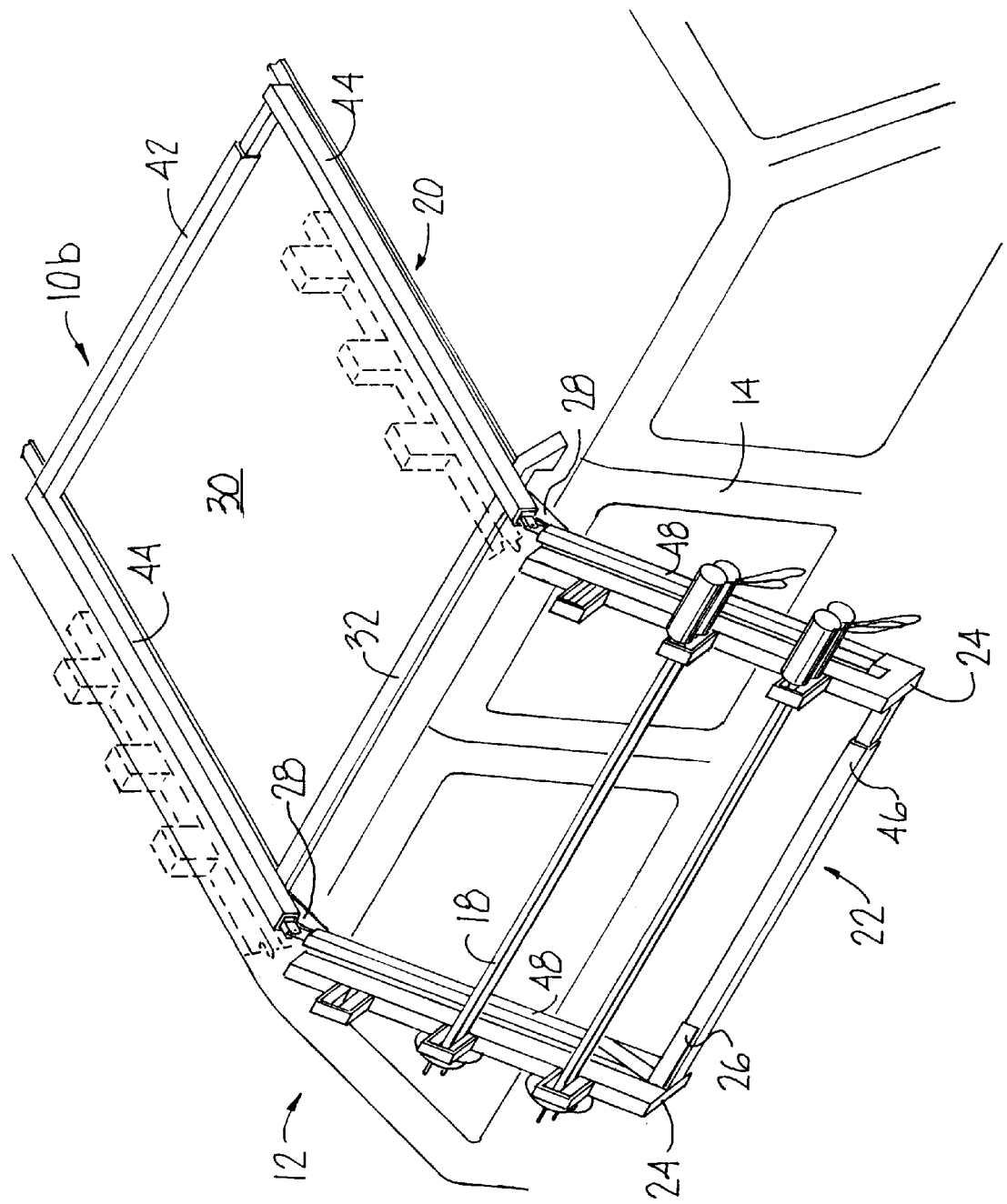
FIG. 2 is a perspective view of the other, opposing half of the roof rack of FIG. 1 in the loading position, showing ski poles mounted therein.

A roof rack 10 for a vehicle 12 in accordance with the present invention as shown in FIGS. 1 and 2 allows for easy loading, unloading and transport of articles mounted thereon without causing damage to the vehicle 12. Skis 16 and ski poles 18 are shown mounted to opposing halves 10a and 10b of roof rack in FIGS. 1 and 2, but it should be understood that any article may be mounted to rack 10 for transport, such as luggage or a luggage carrier. Also, because opposed halves 10a and 10b of rack 10 are mirror images of one another, only one half 10b will be discussed in detail with the understanding that the same details apply as well to half 10a. The roof rack 10 includes support 20, telescoping member 22, L-shaped bracket 24, pivoting latch 26 and brace 28 as shown in FIG. 2.

Vehicle 12 includes any automobile, truck or recreational vehicle. As shown in the figures, vehicle 12 includes a roof 30 to which a luggage rack 32 is mounted. Side panels 34 of the vehicle 12 include side doors and windows.

Figure 3:
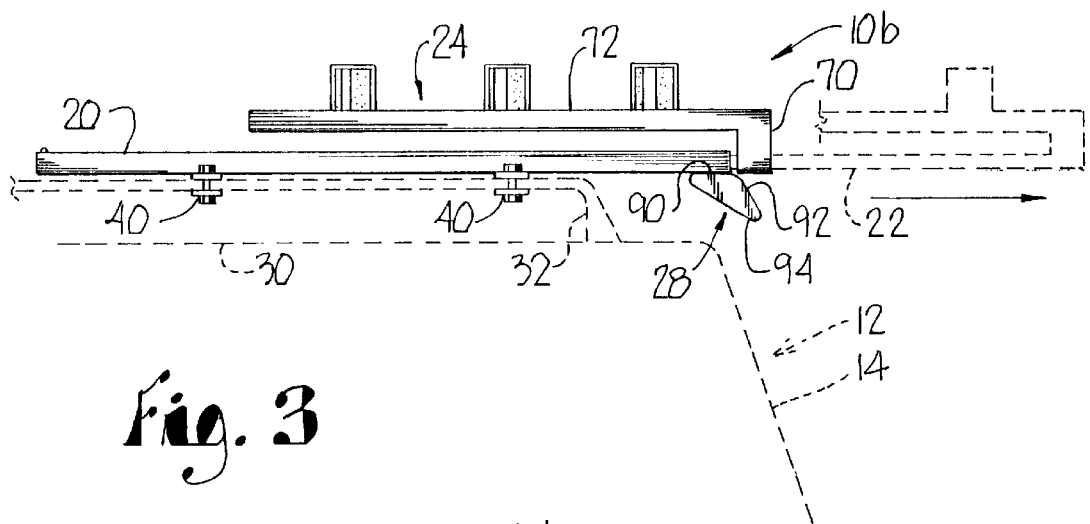
FIG. 3 is a side view of the roof rack of FIG. 2 in the transport position with the poles removed, and with the rack's movement to the loading position shown in dashed lines.
Figure 4:
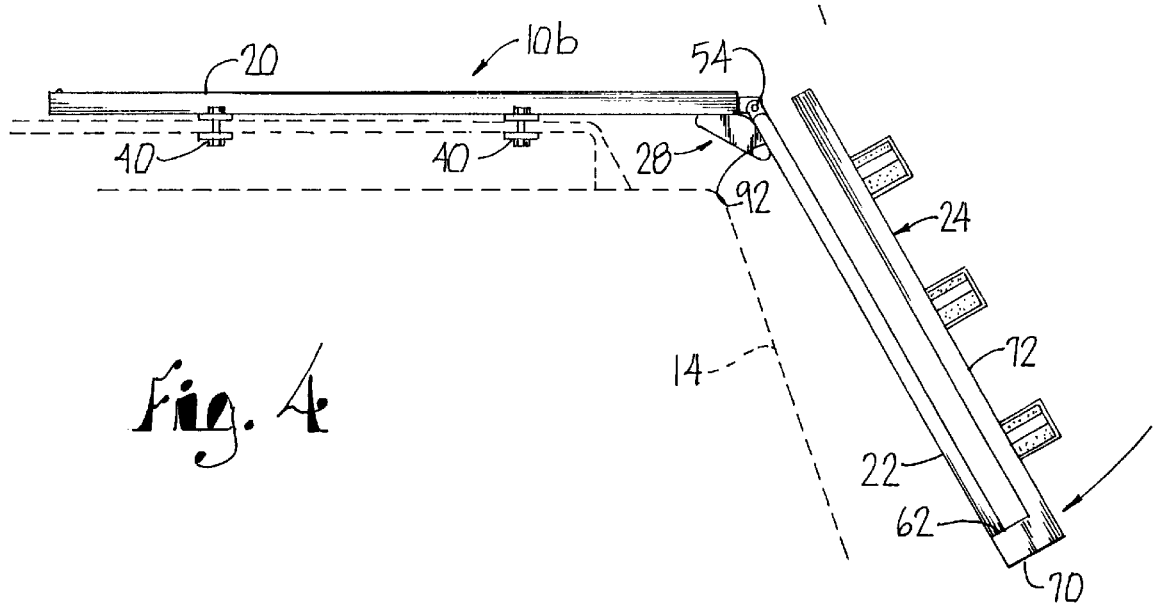
FIG. 4 is a side view of the roof rack of FIG. 3 but in the loading position.
Figure 5:
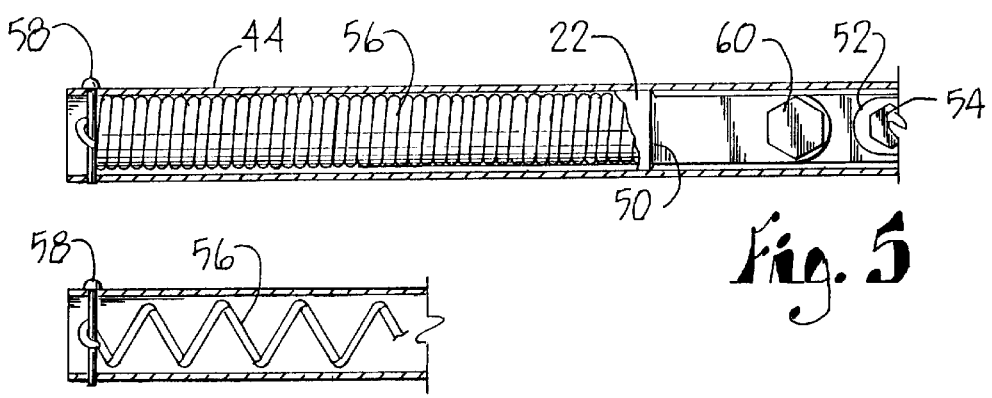
FIG. 5 is a partial side view of the telescoping member in the transport position broken away to show the spring mounted therein.

As seen in FIG. 2, the support or frame 20 includes a cross-bar 42 which connects parallel extending arms 44 as seen in FIG. 2. As shown, cross-bar 42 and arms 44 extend perpendicularly to each other. The support 20 is detachably but rigidly secured over the vehicle's roof 30 to vehicle's luggage rack 32 in a conventional manner via mounting brackets 40 as seen in FIGS. 3 and 4. The cross-bar 42 slidably adjusts the span of the support 20 to correspond to the span of the luggage rack 32. See FIG. 2.

The telescoping member 22 is slidably attached to the support 20 for movement between a transport position, as seen in FIGS. 1 and 3, and a loading position as seen in FIGS. 2 and 4. The telescoping member 22 includes a cross-bar 46 and opposed arms 48. The cross-bar 46 extends between and connects the arms 48 at the outer ends thereof. Each arm 48 includes a first segment 50 hinged to a second segment 52 by a hinge pin 54 at ends thereof. See FIGS. 2–4.

Figure 6:
FIG. 6 is a partial side view of the telescoping member in the loading position broken away to show the spring mounted therein.

The first segments 50 each include a coiled spring 56 which extends therein to slidably secure the first segments 50 within the arms 44 of the support 20. The springs 56 are mounted within the corresponding first segment 50 and are secured at one end to pin 58 and at the other end by bolt 60. See FIG. 6.

Skis 16 and ski poles 18 are mounted to L-shaped brackets 24 which include first portions 70 and second portions 72. First portions 70 are fixedly attached to the outer end 62 of a corresponding second segment 52 of the telescoping member 22 (see FIG. 4), and the second portions 72 preferably extend parallel to the arms 44 of the support 20 and the second segments 52 of the telescoping member 22, as seen in FIGS. 3 and 4. Thus, the L-shaped brackets 24 space any load mounted thereto above the vehicle's roof 30.

Rack 10 may include braces 73 which are securely and fixedly mounted to the support 20 as seen in FIGS. 3 and 4. Braces 73 support the free ends of the second portions 72 of L-shaped brackets 24 when in the transport position.

Figure 7:
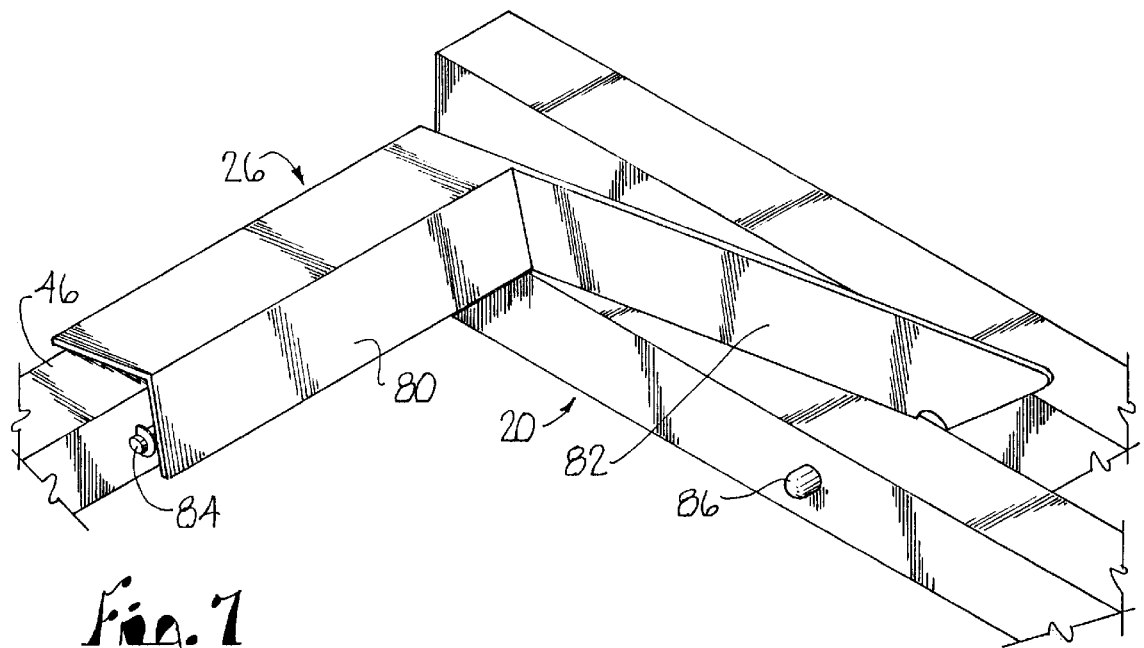
FIG. 7 is an enlarged perspective view of the roof rack's pivotal latch shown unlatched.
Figure 8:
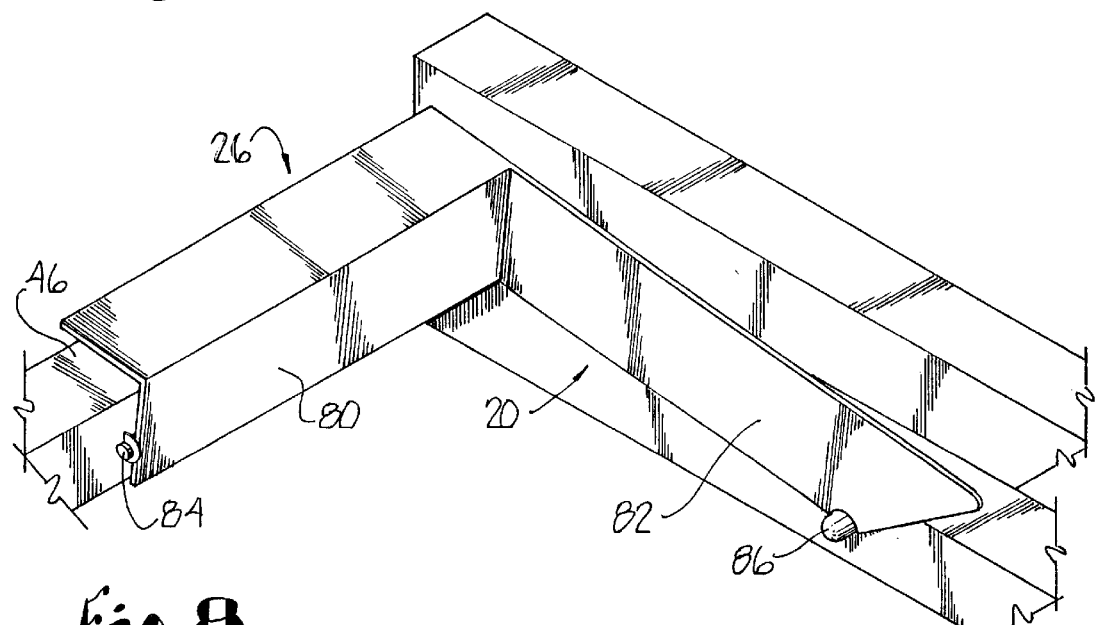
FIG. 8 is an enlarged perspective of the roof rack's pivotal latch shown latched.

As seen in FIGS. 7 and 8, the pivoting latch 26 is hingedly attached to the telescoping member 22 at a corner formed by the cross-bar 46 and an arm 48. Latch 26 includes handle portion 80 and latch portion 82, and it pivots about hinge 84. Latch portion 82 engages latch pin 86 which is mounted to and extends from an arm 44 of the support 20 to lock or latch the telescoping member 22 in the transport position, as in FIG. 1.

Rotation of the second segment 52 of the telescoping member 22 about its axis is limited by the brace 28, as seen in FIG. 4. Brace 28 preferably presents a triangular wedge and is securely mounted along one surface 90 beneath the support 20 at the outer end of an arm 44 thereof, as in FIG. 3. Thus, when telescoping member 22 is in the transport position, as in FIGS. 1 and 3, the brace 28 is generally adjacent the junction between the telescoping member's second segment 52 and the corresponding L-shaped bracket 24. The second segment 52 of the telescoping member, near its hinged end, engages a second surface 92 of the brace 28 when the rack 10 is in its loading position, as shown in FIG. 4. The second surface 92 extends angularly outwardly from the first surface 90, with a third surface 94 extending between the other ends of the first and second surfaces 90 and 92.

Operation

In operation, roof rack 10 is moveable between a transport or protracted position, as in FIGS. 1 and 3, and a loading or extended position, as in FIGS. 2 and 4. More specifically, when in the transport position, the telescoping member 22 is released or unlatched by applying pressure to the handle 80 of latch 26 which pivots the latch portion 82 thereof upward and out of engagement with the latch pin 86 as seen in FIG. 7.

The telescoping member 22 can then be pulled outwardly from within the support arms 44 as shown in FIGS. 2 and 4 with the springs 56 preventing the first segments 50 from sliding out of the corresponding support arms 44. The second segments 52 are then free to pivot downwardly at hinge pin 54 into engagement with the second surface 92 of the brace 28, which prevents the second segment 52 from hitting or engaging the side panel 14 of the vehicle 12. The movement of the second segment 52 of the telescoping member 22 is shown by the arrows in FIGS. 3 and 4. Thus, once in this loading position, the brace 28 maintains the second segment 52 in a spaced-apart relationship with the side panel 14 of the vehicle and prevents any damage thereto.

Any articles, such as skis 16 and poles 18, are easily unloaded and/or unloaded onto the rack 10. Of course, rack 10 is easily returned to its transport position by pivoting the second segment 52 upwardly and sliding the telescoping member 22 into the support arms 44. This action is aided by the springs 56. Rack 10 is secured in this position by pivoting the latch 26 into engagement over the latch pin 86.

It is to be understood that while a certain form of this invention has been illustrated and described, it is not limited thereto except insofar as such limitations are included in the following claims and allowable functional equivalents thereof.

Having thus described the invention, what is claimed as new and desired to be secured by Letters Patent is as follows:

1. A roof rack for a vehicle, comprising:
   a support member adapted to be detachably secured to a roof of a vehicle;
   a telescoping member slidably attached to said support member for movement between a retracted and an extended position, said telescoping member including:
      a first segment hinged to a second segment about a horizontal axis, said second segment being free from contact with said support member when said telescoping member is in said extended position, whereby said second segment is selectively rotatable about said horizontal axis;
   a generally L-shaped member having a first portion attached to an outer end of said second segment of said telescoping member and a laterally extending second portion extending above and generally parallel to said support member when said telescoping member is in said retracted position whereby said second portion of said L-shaped member is adapted for receiving a load thereon and for spacing the load on said rack above said support member and the vehicle's roof; and
   a brace fixed to said support member and supporting said telescoping member when in said extended position to limit the rotation of said second segment of said telescoping member and prevent contact with the vehicle.

2. A roof rack for a vehicle as claimed in claim 1 wherein said telescoping member includes a spring attached to an end of said first segment and to said support member to slidably secure said telescoping member thereto.

3. A roof rack for a vehicle as claimed in claim 1 wherein said brace is a triangular wedge.

4. A roof rack for a vehicle as claimed in claim 1 wherein said brace includes an angularly extending surface which supports said telescoping member when in said extended position.

5. A roof rack for a vehicle as claimed in claim 1 wherein said brace is mounted to said support adjacent said second segment of said telescoping member when in said retracted position.

6. A roof rack for a vehicle as claimed in claim 1 further comprising a latch pivotally attached to said telescoping member and releasably securing said telescoping member in said retracted position to said support member.

7. A roof rack for a vehicle, comprising:
   a first and second spaced-apart support members adapted to be detachably secured to a roof of a vehicle;
   a first and second spaced-apart telescoping members respectively slidably attached to said support members and moveable between a retracted and an extended position, said telescoping members each including a first segment hinged to a second segment about a horizontal axis, said second segments being free from contact with said support member when said corresponding telescoping member is in said extended position, whereby said second segments selectively rotate about said horizontal axis;

a first and second L-shaped members, said first L-shaped member having a first portion secured to an outer end of said second segment of said first telescoping member spaced from said first segment, said second L-shaped member having a first portion secured to an outer end of said second segment of said second telescoping member spaced from said first segment, each said L-shaped members having a laterally extending second portion respectively extending above and approximately parallel to said support members when said telescoping members are in said retracted position whereby said second portions of said L-shaped members are adapted to receive a load thereon and space the load above said support members and said vehicle roof when said telescoping members are in said retracted position;

a support cross bar extending between said support members and attached to said support members, said support cross bar having a first member and a second member, said first member slidably attached to said second member;

a telescoping member cross bar extending between and attached to said telescoping member second segments distal said telescoping member first segments, said telescoping member cross bar having a first member and a second member, said first member slidably attached to said second member;

a first and second brace respectively fixed to said support members and supporting said telescoping members to limit the rotation about the horizontal axis of said second segments when in said extended position to prevent contact with the vehicle.

8. A roof rack for a vehicle as claimed in claim 7 wherein said support members are mounted parallel relative to each other.

9. A roof rack for a vehicle as claimed in claim 7 further comprising means for retracting said telescoping members from said extended position to said retracted position.

10. A roof rack for a vehicle as claimed in claim 7 wherein each said brace is a triangular wedge.

11. A roof rack for a vehicle as claimed in claim 7 further comprising a latch and a latch pin, said latch pivotally attached to said telescoping member cross bar adjacent said first telescoping member, said latch pin extending from an inside vertical surface of said first support member distal said support member cross bar, said latch adapted to releasably engage said latch pin when said telescoping members are in said retracted position.

12. A roof rack for a vehicle as claimed in claim 7 wherein each said brace includes an angularly extending surface which supports said telescoping members when in said extended position.

13. A roof rack for a vehicle as claimed in claim 7 wherein each said brace is respectively mounted to said support members adjacent a junction between one said second segment of one said telescoping member and one said L-shaped member when in said retracted position.

14. A roof rack for a vehicle, comprising:

a support member adapted to be detachably secured to a roof of a vehicle;

a telescoping member slidably attached to said support member for movement between a retracted and an extended position, said telescoping member including:
a first segment hinged to a second segment about a horizontal axis, said second segment being free from contact with said support member when said telescopic member is in said extended position, whereby said second segment selectively rotates about said horizontal axis;

an L-shaped member having a free end and a fixed end, said fixed end attached to an outer end of said second segment of said telescoping member, said free end extending above and approximately parallel to said support member when said telescoping member is in said retracted position for spacing receiving a load on said L-shaped member which spaces the load above said support member and the vehicle's roof; and a brace fixedly mounted to said support member adjacent a junction between said telescoping member and said L-shaped member, when in said retracted position;

said brace presenting a triangular wedge which includes an angularly extending surface that supports said telescoping member when in said extended position to prevent said telescoping member from contacting the vehicle.

15. A roof rack for a vehicle as claimed in claim 14 further comprising a latch pivotally attached to said telescoping member and releasably securing said telescoping member in said retracted position to said support member.

16. A roof rack for a vehicle as claimed in claim 14 further comprising load mounting brackets attached to said L-shaped member.

17. A roof rack for a vehicle as claimed in claim 15 wherein said load is one of a set of snow skis and ski poles.

18. A roof rack for a vehicle as claimed in claim 14 further comprising a support brace attached to said support member and adapted to support said L-shaped member free end when said telescoping member is in said retracted position.

* * * * *